(12) United States Patent
Huang

(10) Patent No.: US 11,635,185 B1
(45) Date of Patent: Apr. 25, 2023

(54) VEHICLE LAMP STRUCTURE

(71) Applicant: MIN HSIANG CORPORATION, Tainan (TW)

(72) Inventor: Chung-Chi Huang, Tainan (TW)

(73) Assignee: Min Hsiang Corporation, Tainan (TW)

( * ) Notice: Subject to any disclaimer, the term of this patent is extended or adjusted under 35 U.S.C. 154(b) by 0 days.

(21) Appl. No.: 17/880,460

(22) Filed: Aug. 3, 2022

(51) Int. Cl.
*F21S 41/148* (2018.01)
*F21S 41/24* (2018.01)
*F21S 43/241* (2018.01)
*F21V 8/00* (2006.01)
*F21S 43/245* (2018.01)

(52) U.S. Cl.
CPC .......... *F21S 43/241* (2018.01); *F21S 41/148* (2018.01); *F21S 41/24* (2018.01); *F21S 43/245* (2018.01); *G02B 6/0038* (2013.01)

(58) Field of Classification Search
CPC ......... F21S 41/147; F21S 41/148; F21S 41/24
See application file for complete search history.

(56) References Cited

U.S. PATENT DOCUMENTS

2022/0136671 A1\* 5/2022 Zhu .................. F21S 41/285
362/520

\* cited by examiner

*Primary Examiner* — Sean P Gramling
(74) *Attorney, Agent, or Firm* — Rosenberg, Klein & Lee

(57) ABSTRACT

The invention provides a vehicle lamp structure, which includes a first substrate, a first light-emitting element, a light guide and an optical member. The first light-emitting element is disposed on the first substrate. The light guide includes a light guide body and a light guide bump. The light guide body has an arc structure facing forward. The light guide body extends backward to form the light guide bump. The first light-emitting element is arranged below the light guide bump. The optical member is arranged in front of the light guide. The first light-emitting element upwardly emits a first light ray into the light guide bumps. After being reflected by the light guide bumps, the first light ray travels forward and emits from the arc structure. The first light ray is then received by and transmitted through the optical member.

19 Claims, 7 Drawing Sheets

VEHICLE LAMP STRUCTURE

FIELD OF THE INVENTION

The present invention relates generally to a vehicle lamp structure, and particularly to a vehicle lamp structure with uniform light.

BACKGROUND OF THE INVENTION

Vehicle lamps include turn-signal lamps, low-beam lamps, and high-beam lamps. The usage and design of lamps must comply with regulations. To prevent harassment of others, they are not allowed to be disposed or modified at liberty. For example, the light shape of a low-beam lamp must include an obvious cutoff line; the brightness and illuminating distance of a high-beam light must be greater than those of a low-beam lamp.

Please refer to the U.S. Pat. No. 9,714,747, which discloses a vehicle lamp capable of selecting high-beam illumination or low-beam illumination for improving the gap problem between low-beam and high-beam light distribution patterns. Unfortunately, the invention requires massive light sources disposed below the high-beam light guide and making the installation complicated. In addition, the design and fabrication for the two light-emitting surfaces are complex, leading to high manufacturing costs.

Accordingly, the present invention provides a vehicle lamp structure for solving the problem of requiring massive light sources according to the prior art. Furthermore, the present invention can improve the high manufacturing cost problem due to massive light sources and two light-emitting surfaces. Besides, the arc structure of the light guide according to the present invention enables an obvious cutoff line; the angle between the light guide body and the horizontal surface enables the light from the light source to emit toward a specific direction with increased light-emitting efficiency.

SUMMARY

An objective of the present invention is to improve the disposal problem caused by massive light-emitting elements by using few light-emitting elements. The light guide bump partially extends from the light guide body and thus reducing materials and costs in manufacturing. The angle between the light guide and the horizontal surface enables the high-beam light to be concentrated and be emitted toward a specific direction and thus achieving uniform light distribution and increased light-emitting efficiency. In addition, when the low-beam light passes through the light guide body, a portion of the light will be blocked by the first extension part and the second extension part and thus achieving an obvious cutoff line.

To achieve the above objectives, the present invention provides a vehicle lamp structure, which comprises a first substrate, a second substrate, a first light-emitting element, a second light-emitting element, a light guide, and an optical member. The first light-emitting element is disposed on the first substrate. The second substrate is disposed above one side of the first substrate. The second light-emitting element is disposed on the second substrate. A reflective member hoods the second light-emitting element. The light guide includes a light guide body and a light guide bump. The light guide body includes a first extension part and a second extension part extended forward from both sides of the light guide body. The first extension part and the second extension part form an arc structure. The light guide body extends backward to form the light guide bump. The first light-emitting element is disposed below the light guide bump. The first light-emitting element emits upward a first light ray to the light guide bump. After being reflected by the light guide bump, the first light ray travels forward and emits from the arc structure. Then the first light ray is received by and transmitted through the optical member.

According to an embodiment of the present invention, two recesses are disposed on both sides of the light guide bump opposing to the first light-emitting element correspondingly. The two recesses extend downward from the top of the light guide bump.

According to an embodiment of the present invention, the shape of the two recesses is an approximate semicircular surface.

According to an embodiment of the present invention, the light guide bump is formed by partially extending backward from the light guide body to present a curved surface with an extension length D.

According to an embodiment of the present invention, the light guide bump partially extends downward from the light guide body to close to the first light-emitting element.

According to an embodiment of the present invention, the extension of a bottom surface of the light guide body and the extension of the first substrate form an angle ranging between 3 and 30 degrees. In addition, the light guide body extends forward from the back with decreasing thickness.

According to an embodiment of the present invention, the second light-emitting element emits upward a second light ray to the light guide bump. After being reflected by the reflective member, the second light ray travels downward and is received by and transmitted through the optical member. A portion of the second light ray is blocked by the first extension part and the second extension part when it travels downward.

DETAILED DESCRIPTION

In order to make the structure and characteristics as well as the effectiveness of the present invention to be further understood and recognized, the detailed description of the present invention is provided as follows along with embodiments and accompanying figures.

In the following description, various embodiments of the present invention are described using figures for describing the present invention in detail. Nonetheless, the concepts of the present invention can be embodied by various forms. Those embodiments are not used to limit the scope and range of the present invention.

Figure 1:
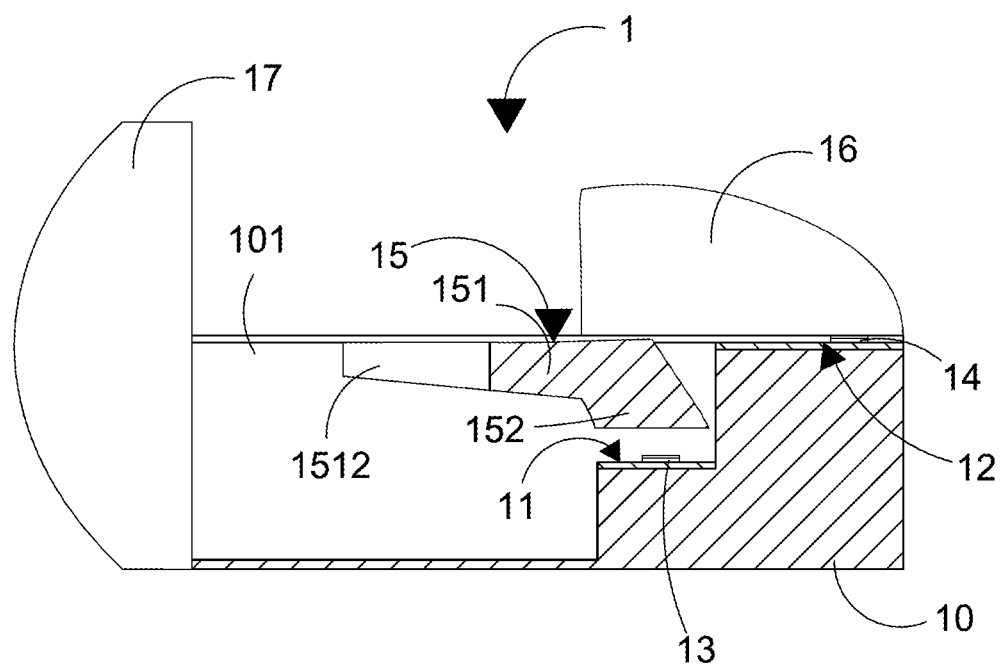
FIG. 1 shows a schematic side view according to an embodiment of the present invention.
Figure 2:
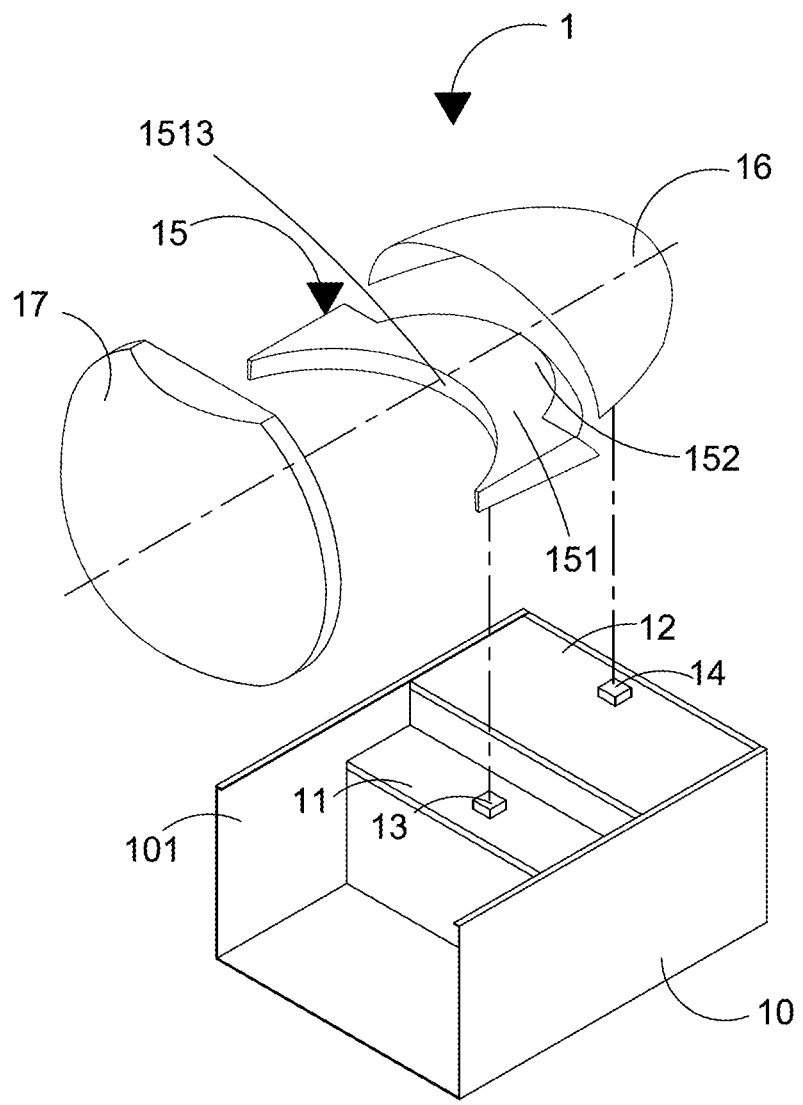
FIG. 2 shows a schematic exploded view according to an embodiment of the present invention.
Figure 3:
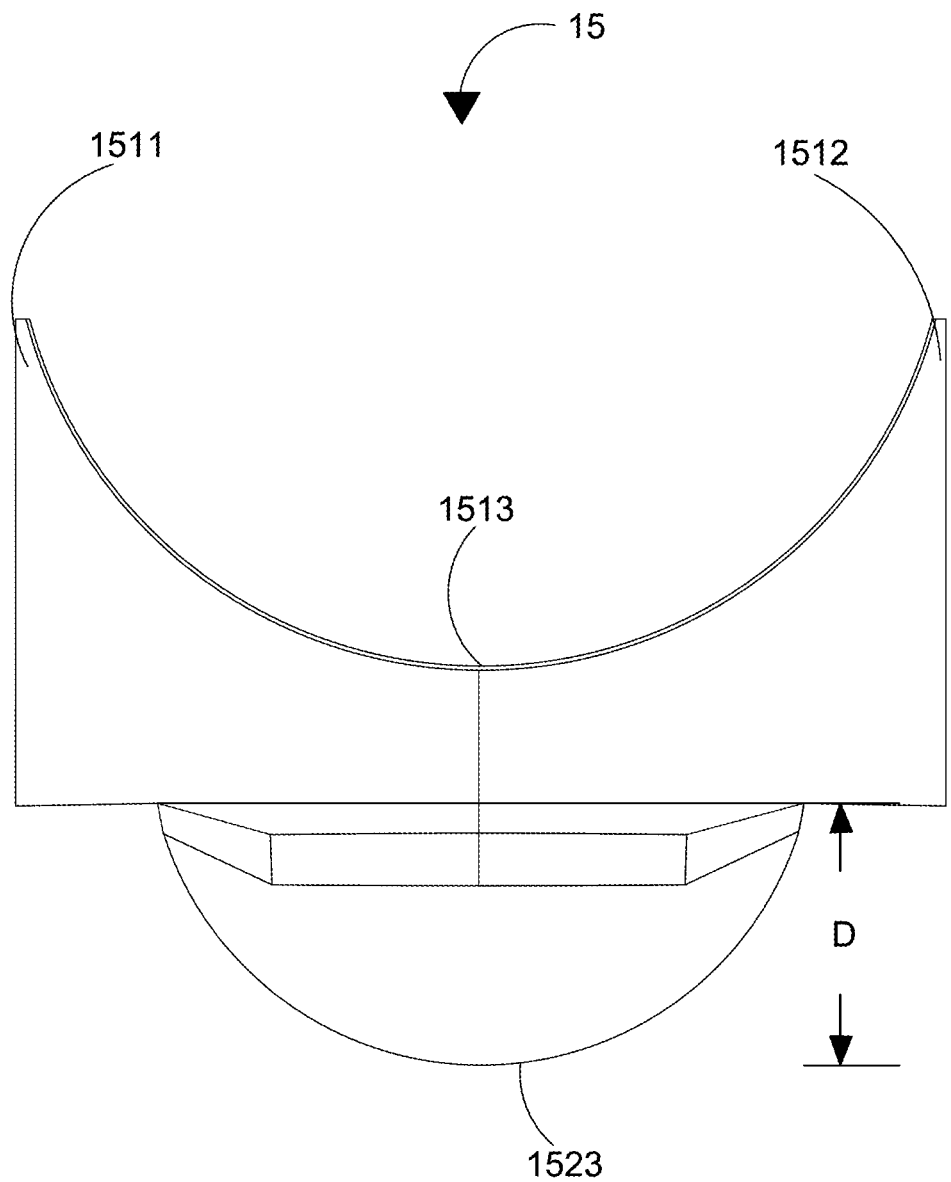
FIG. 3 shows a schematic bottom view of the light guide according to an embodiment of the present invention.

First, please refer to FIG. 1, FIG. 2, and FIG. 3, which show a schematic side view, a schematic exploded view, and a schematic bottom view according to an embodiment of the present invention. The vehicle lamp structure 1 according to the present embodiment can be applied, but not limited, to a motorcycle headlight or an all-terrain vehicle headlight. According to the present embodiment, the vehicle lamp structure 1 comprises a first substrate 11, a first light-emitting element 13, a light guide 15, and an optical member 17. According to the present embodiment, a single first light-emitting element 13 is adopted for saving the light-emitting element and thus solving the cost problem owing to the disposal and number of massive light-emitting elements. According to another embodiment, a plurality of light-emitting elements 13 can be adopted and concentrated at the center of the first substrate 11. Nonetheless, the present invention is not limited to the embodiment. The first light-emitting element 13 is a high-beam light-emitting element.

The vehicle lamp structure 1 comprises a case 10. The case 10 includes an accommodating space 101. The first substrate 11 and the optical member 17 are disposed in the accommodating space 101. The first light-emitting element 13 is disposed on the first substrate 11. The light guide 15 is fixed to the case 10 and disposed in the accommodating space 101. The fixing method according to the present invention includes, but not limited to, gluing, screwing, riveting, wedging, engaging, and clipping. The light guide 15 includes a light guide body 151 and a light guide bump 152. The light guide body 151 extends backward to form the light guide bump 152. The first light-emitting element 13 is disposed below the light guide bump 152. The light guide body 151 includes an arc structure 1513 facing forward. The arc structure 1513 is formed by extending forward a first extension part 1511 and a second extension part 1512 from both sides of the light guide body 151. The optical member 17 is disposed in front of the light guide 15. According to the present embodiment, the optical member 17 is, but not limited to, an outer lens.

Figure 4:
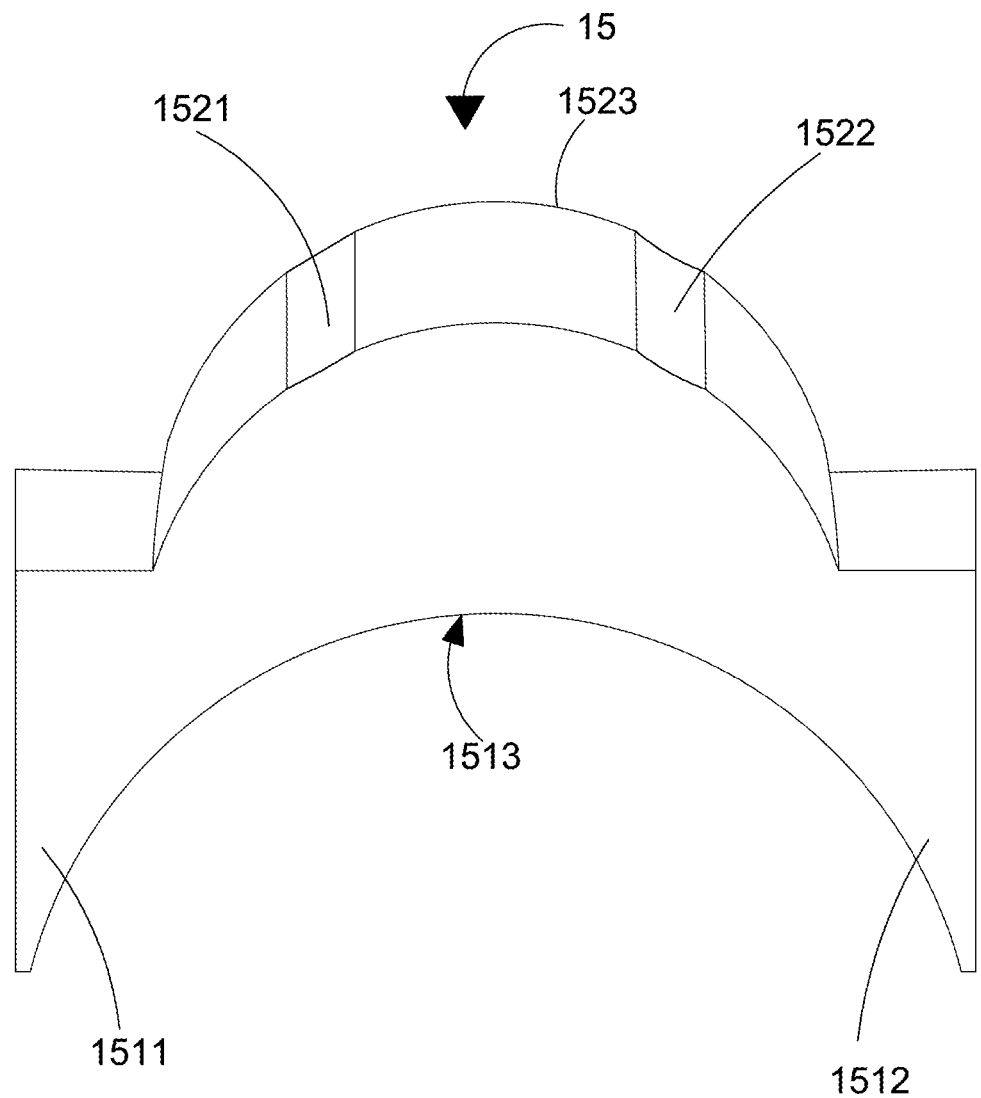
FIG. 4 shows a schematic top view of the light guide according to an embodiment of the present invention.

Moreover, please refer to FIG. 3 again and further refer to FIG. 4, which shows a schematic top view of the light guide according to an embodiment of the present invention. Two recesses 1521, 1522 are disposed on both sides of the light guide bump 152 opposing to the first light-emitting element 13 correspondingly. The two recesses 1521, 1522 extend downward from the top of the light guide bump 152. According to the present embodiment, the shape of the two recesses 1521, 1522 is, but not limited to, an approximate semicircular surface. The light guide bump 152 is formed by partially extending backward from the light guide body 151 to present a curved surface 1523 with an extension length D. The light guide bump 152 also partially extends downward from the light guide body 151 to close to the first light-emitting element 13. According to the present embodiment, the light guide bump 152 extends only partially for achieving the efficacy of saving materials.

Figure 5:
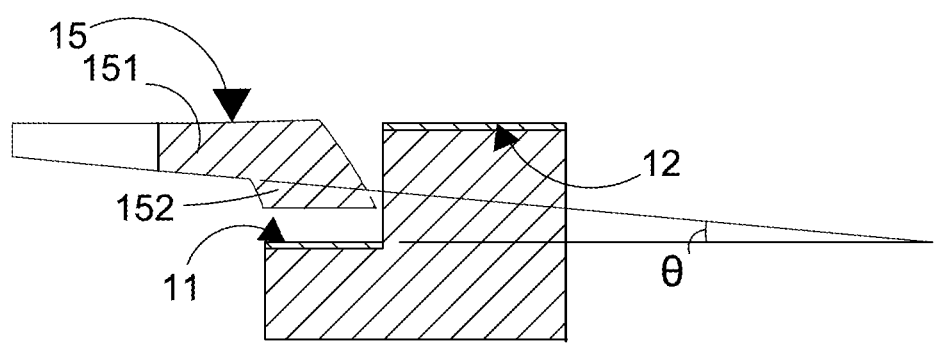
FIG. 5 shows a schematic diagram of the angle between the light guide and the first substrate according to an embodiment of the present invention.
Figure 6:
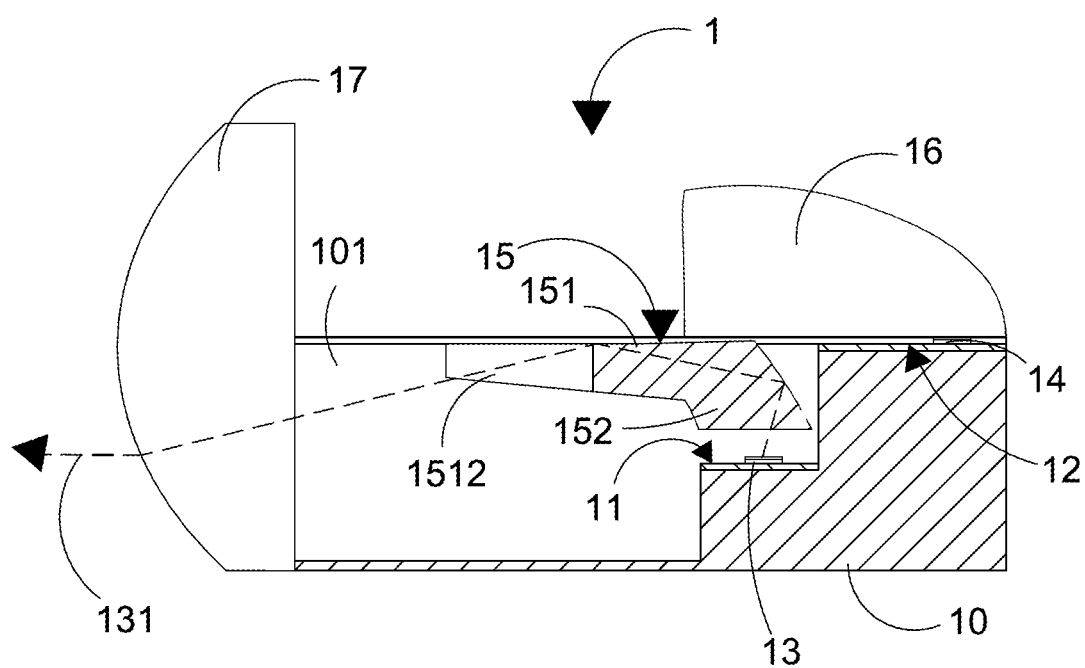
FIG. 6 shows a schematic side view of the high-beam path according to an embodiment of the present invention.

Please refer to FIG. 5 and FIG. 6. FIG. 5 shows a schematic diagram of the angle between the light guide and the first substrate according to an embodiment of the present invention; FIG. 6 shows a schematic side view of the high-beam path according to an embodiment of the present invention. According to the present embodiment, the extension of a bottom surface of the light guide body 151 and the extension of the first substrate 11 form an angle θ ranging between 3 and 30 degrees. In addition, the light guide body 151 extends forward from the back with decreasing thickness. After being repeatedly reflected in the light guide 15, the light is guided to and emitted from the arc structure 1513 and thus achieving the effect of distributing and uniformizing the light. Accordingly, the first light-emitting element 13 according to the present invention emits upward a first light ray 131 to the light guide bump 152. After multiple reflection in the light guide bump 152, the first light ray 131 travels forward and emits from the arc structure 1513. Afterwards, the first light ray 131 is received by and transmitted through the optical member 17. To elaborate, according to the present embodiment, by using the design of the light guide bump 152 of the light guide 15, the first light ray 131 can be concentrated and guided into the light guide body 151 after multiple reflections. By using the design of the angle θ of the light guide body 151, the first light ray 131 can be guided to be concentrated and travel toward a specific direction for increasing the subsequent light-emitting efficiency. Besides, by using the designs of the two recesses 1521, 1522 as well as the curved surface 1523 of the light guide bump 152, the first light ray 131 guided into the light guide body 151 can be distributed and uniformized. Furthermore, after the first light ray 131 is transmitted through the optical member 17, a high-beam light shape (not shown in the figure) will be formed.

Figure 7:
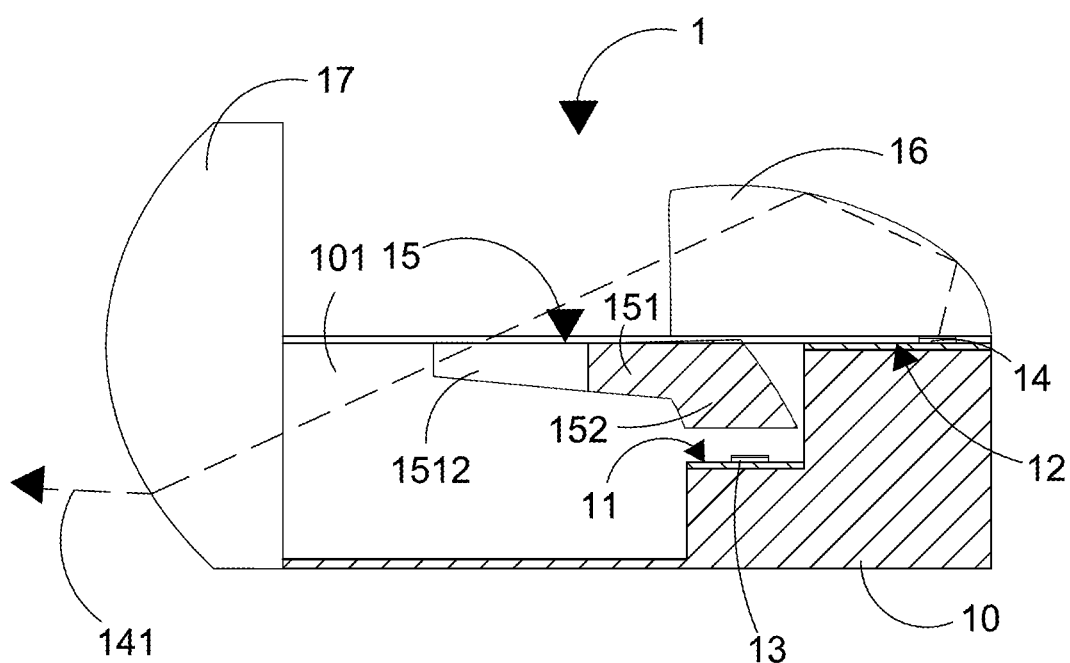
FIG. 7 shows a schematic side view of the low-beam path according to an embodiment of the present invention.

Please refer to FIG. 7, which shows a schematic side view of the low-beam path according to an embodiment of the present invention. According to the present embodiment, the vehicle lamp structure 1 also comprises a second substrate 12, a second light-emitting element 14, and a reflective member 16. According to the present embodiment, a single second light-emitting element 14 is adopted. According to another embodiment, a plurality of second light-emitting elements 14 can be adopted. Nonetheless, the present invention is not limited to the embodiment. The second light-emitting element 14 is a low-beam element. The second substrate 12 is disposed above one side of the first substrate 11 and inside the accommodating space 101. The second light-emitting element 14 is disposed on the second substrate 12. The reflective member 16 hoods the second light-emitting element 14 and is disposed on the case 10. The second light-emitting element 14 emits upward a second light ray 141. After being reflected by the reflective member 16, the second light ray 141 travels downward and is received by and transmitted through the optical member 17. After transmitting through the optical member 17, the second light ray 141 forms a low-beam light shape (not shown in the figure). According to the present embodiment, the first substrate 11 and a second substrate 12 are, but not limited to, circuit boards.

Furthermore, when most of the second light ray 141 travels downward, it will pass by the light guide 15. Then a portion of the second light ray 141 will be blocked by the first extension part 1511 and the second extension part 1512. Most of the second light ray 141 is not blocked by the first extension part 1511 and the second extension part 1512 but travels directly to the optical member 17. By using the blocking by the first extension part 1511 and the second extension part 1512, an obvious cutoff line can be achieved and hence complying with the regulation. According to the present embodiment, the first light-emitting element 13 and the second light-emitting element 14 are, but not limited to, light-emitting diodes (LEDs).

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A vehicle lamp structure, comprising:
   a first substrate;
   a first light-emitting element, disposed on said first substrate;
   a light guide, including a light guide body and a light guide bump, said light guide body including an arc structure facing forward, said light guide body extending backward to form said light guide bump, and said first light-emitting element disposed below said light guide bump; and
   an optical member, disposed in front of said light guide;
   wherein said first light-emitting element emits upward a first light ray into said light guide bump; after being reflected by said light guide bump, said first light ray travels forward and emits from said arc structure; and then said first light ray is received by and transmitted through said optical member, two recesses are disposed on both sides of said light guide bump opposing to said first light-emitting element correspondingly; and said two recesses extend downward from the top of said light guide bump.

2. The vehicle lamp structure of claim 1, wherein said light guide body includes a first extension part and a second extension part extended forward from both sides of said light guide body; and said first extension part and said second extension part form said arc structure.

3. The vehicle lamp structure of claim 2, wherein a second substrate is disposed above one side of said first substrate; a second light-emitting element is disposed on said second substrate; a reflective member hoods said second light-emitting element; said second light-emitting element emits upward a second light ray; after being reflected by said reflective member, said second light ray travels downward and is received by and transmitted through said optical member; and a portion of said second light ray is blocked by said first extension part and said second extension part when it travels downward.

4. The vehicle lamp structure of claim 1, wherein the shape of said two recesses is an approximate semicircular surface.

5. The vehicle lamp structure of claim 1, wherein said light guide bump is formed by partially extending backward from said light guide body to present a curved surface with an extension length D.

6. The vehicle lamp structure of claim 1, wherein the extension of a bottom surface of said light guide body and the extension of said first substrate form an angle ranging between 3 and 30 degrees; and said light guide body extends forward from the back with decreasing thickness.

7. The vehicle lamp structure of claim 1, wherein said vehicle lamp structure can be applied to a motorcycle headlight or an all-terrain vehicle headlight.

8. A vehicle lamp structure, comprising:
   a first substrate;
   a first light-emitting element, disposed on said first substrate;
   a light guide, including a light guide body and a light guide bump, said light guide body extending backward to form said light guide bump, and said first light-emitting element disposed below said light guide bump; and
   an outer lens, disposed in front of said light guide;
   wherein said light guide bump is formed by partially extending backward from said light guide body to present a curved surface in a bottom view of said light guide; said first light-emitting element emits upward a first light ray into said light guide bump; after being reflected by said light guide bump, said first light ray is received by and transmitted through said outer lens, two recesses are disposed on both sides of said light guide bump opposing to said first light-emitting element correspondingly; the shape of said two recesses is an approximate semicircular surface; and said two recesses extend downward from the top of said light guide bump.

9. The vehicle lamp structure of claim 8, wherein said light guide bump partially extends downward from said light guide body to close to said first light-emitting element.

10. The vehicle lamp structure of claim 8, wherein said first light-emitting element is a high-beam light-emitting element.

11. The vehicle lamp structure of claim 8, wherein said light guide body includes an arc structure facing forward; said light guide body includes a first extension part and a second extension part extended forward from both sides of said light guide body; and said first extension part and said second extension part form said arc structure.

12. The vehicle lamp structure of claim 11, wherein after being reflected by said light guide bump, said first light ray travels forward and emits from said arc structure; and then said first light ray is received by and transmitted through said outer lens.

13. The vehicle lamp structure of claim 11, wherein a second substrate is disposed above one side of said first substrate; a second light-emitting element is disposed on said second substrate; a reflective member hoods said second light-emitting element; said second light-emitting element emits upward a second light ray; after being reflected by said reflective member, said second light ray travels downward and is received by and transmitted through said outer lens; and a portion of said second light ray is blocked by said first extension part and said second extension part when it travels downward.

14. The vehicle lamp structure of claim 8, wherein the extension of a bottom surface of said light guide body and the extension of said first substrate form an angle ranging between 3 and 30 degrees; and said light guide body extends forward from the back with decreasing thickness.

15. The vehicle lamp structure of claim 8, wherein said vehicle lamp structure can be applied to a motorcycle headlight or an all-terrain vehicle headlight.

16. A vehicle lamp structure, comprising:
   a first substrate;
   a first light-emitting element, disposed on said first substrate;
   a light guide, including a light guide body and a light guide bump, said light guide body including an arc structure facing forward, said light guide body extending backward to form said light guide bump, and said first light-emitting element disposed below said light guide bump; and
   an optical member, disposed in front of said light guide;
   a second substrate, disposed near said first substrate;
   a second light-emitting element, disposed on said second substrate, said second light-emitting element emitting upward a second light ray;
   wherein said first light-emitting element emits upward a first light ray into said light guide bump; after being reflected by said light guide bump, said first light ray travels forward and emits from said arc structure; and then said first light ray is received by and transmitted through said optical member, a direction of said first light ray is substantially the same as a direction of said second light ray.

17. The vehicle lamp structure of claim 16, wherein said light guide body includes a first extension part and a second extension part extended forward from both sides of said light guide body; and said first extension part and said second extension part form said arc structure.

18. The vehicle lamp structure of claim 17, wherein a second substrate is disposed above one side of said first substrate; a second light-emitting element is disposed on said second substrate; a reflective member hoods said second light-emitting element; said second light-emitting element emits upward a second light ray; after being reflected by said reflective member, said second light ray travels downward and is received by and transmitted through said optical member; and a portion of said second light ray is blocked by said first extension part and said second extension part when it travels downward.

19. The vehicle lamp structure of claim 16, wherein said light guide bump is formed by partially extending backward from said light guide body to present a curved surface with an extension length D.

\* \* \* \* \*